(12) United States Patent
Yuki et al.

(10) Patent No.: US 10,634,074 B2
(45) Date of Patent: Apr. 28, 2020

(54) EGR DEVICE

(71) Applicant: YANMAR CO., LTD., Osaka-shi (JP)

(72) Inventors: Ryo Yuki, Osaka (JP); Satoshi Nakano, Osaka (JP); Takuya Ishiguro, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/120,096

(22) PCT Filed: Jan. 29, 2015

(86) PCT No.: PCT/JP2015/052423
§ 371 (c)(1),
(2) Date: Aug. 18, 2016

(87) PCT Pub. No.: WO2015/125576
PCT Pub. Date: Aug. 27, 2015

(65) Prior Publication Data
US 2017/0058794 A1 Mar. 2, 2017

(30) Foreign Application Priority Data

Feb. 20, 2014 (JP) .................................. 2014-031006

(51) Int. Cl.
*F02D 41/00* (2006.01)
*F02D 41/08* (2006.01)
*F02D 21/08* (2006.01)

(52) U.S. Cl.
CPC ........... *F02D 41/005* (2013.01); *F02D 21/08* (2013.01); *F02D 41/08* (2013.01); *F02D 2021/083* (2013.01); *Y02T 10/47* (2013.01)

(58) Field of Classification Search
CPC . Y02T 10/47; F02D 2021/083; F02D 41/005; F02D 21/08; F02D 41/08
(Continued)

(56) References Cited

U.S. PATENT DOCUMENTS

| 5,947,080 A | 9/1999 | Weissman et al. |
| 7,398,148 B2 * | 7/2008 | Yoshioka ............ F02D 41/0005 123/568.21 |

(Continued)

FOREIGN PATENT DOCUMENTS

| EP | 1772611 A | 4/2007 |
| EP | 2390490 A | 11/2011 |

(Continued)

OTHER PUBLICATIONS

Extended European Search Report dated Dec. 7, 2017 in corresponding EP Patent Application No. 15752606.2 in 8 pages.

(Continued)

*Primary Examiner* — Xiao En Mo
(74) *Attorney, Agent, or Firm* — Norton Rose Fulbright US LLP

(57) ABSTRACT

In an EGR device configured to reflux part of exhaust gas of the engine as EGR gas into intake air of the engine, an EGR valve configured to restrict a flow rate of the EGR gas is closed when rotation speed N of the engine is between a low-speed threshold and a high-speed threshold, and fuel injection rate is between a low-injection rate threshold and a high-injection rate threshold that are set for each rotation speed.

18 Claims, 6 Drawing Sheets

(58) Field of Classification Search
USPC .................................................. 123/568.11
See application file for complete search history.

(56) References Cited

U.S. PATENT DOCUMENTS

| | | | |
|---|---|---|---|
| 8,960,169 B2* | 2/2015 | Takezoe | F02D 41/0077 |
| | | | 123/568.21 |
| 9,341,144 B2* | 5/2016 | Tanaka | F02D 41/0065 |
| 9,803,612 B2* | 10/2017 | Minami | F02P 5/045 |
| 2002/0011233 A1* | 1/2002 | Shiraishi | F01L 9/04 |
| | | | 123/294 |
| 2002/0104309 A1* | 8/2002 | Nishiyama | F01N 3/0842 |
| | | | 60/278 |
| 2005/0217245 A1 | 10/2005 | Haseyama et al. | |
| 2005/0241620 A1* | 11/2005 | Renner | F02M 65/002 |
| | | | 123/494 |
| 2007/0078588 A1 | 5/2007 | Thompson et al. | |
| 2012/0265425 A1 | 10/2012 | Maruyama et al. | |
| 2012/0303249 A1* | 11/2012 | Minami | F02D 41/0072 |
| | | | 701/112 |
| 2012/0303346 A1* | 11/2012 | Takezoe | F02D 41/0072 |
| | | | 703/9 |
| 2013/0061831 A1* | 3/2013 | Gambhir | F02B 47/08 |
| | | | 123/568.21 |
| 2014/0046575 A1* | 2/2014 | Yamane | F02D 45/00 |
| | | | 701/108 |
| 2014/0144414 A1* | 5/2014 | Dean | F02D 41/006 |
| | | | 123/568.14 |
| 2016/0305356 A1* | 10/2016 | Iwata | F02D 41/403 |
| 2016/0312722 A1* | 10/2016 | Nogi | F02D 41/0275 |

FOREIGN PATENT DOCUMENTS

| | | |
|---|---|---|
| JP | S59-160052 A | 9/1984 |
| JP | S62-54264 U | 4/1987 |
| JP | H2-16319 A | 1/1990 |
| JP | H6-43251 U | 6/1994 |
| JP | H08270454 A | 10/1996 |
| JP | H10103119 A | 4/1998 |
| JP | 2000-45797 A | 2/2000 |
| JP | 2001-526355 A | 12/2001 |
| JP | 2002-030963 A | 1/2002 |
| JP | 2003-97308 A | 4/2003 |
| JP | 2005-282477 A | 10/2005 |
| JP | 2011-185171 A | 9/2011 |
| JP | 2012-225309 A | 11/2012 |
| JP | 2013-113093 A | 6/2013 |

OTHER PUBLICATIONS

Notification of Reason for Refusal dated Sep. 11, 2017 in corresponding KR Patent Application No. 10-2016-7025671.

* cited by examiner

EGR DEVICE

CROSS-REFERENCE TO RELATED APPLICATIONS

This application is the U.S. National Phase under 35. U.S.C. § 371 of International Application PCT/JP2015/052423, filed Jan. 29, 2015, which claims priority to Japanese Patent Application No. 2014-031006, filed Feb. 20, 2014. The disclosures of the above-described applications are hereby incorporated by reference in their entirety.

TECHNICAL FIELD

The present invention relates to an EGR device.

BACKGROUND ART

A conventionally known engine is provided with an EGR device that refluxes part of exhaust gas into intake air. Combustion temperature is reduced by the EGR device refluxing the exhaust gas (EGR gas), which contains a low concentration of oxygen, into the intake air, thereby reducing generation of nitrogen oxide. In such an engine, when the exhaust gas is refluxed for a long time in an idling operation state in which the exhaust gas contains unburned fuel, this unburned fuel adheres to the EGR device, potentially causing trouble to the EGR system. Some known engines perform such a control that, in the idling operation state, an EGR valve (exhaust gas reflux valve) is closed to stop the refluxing of the exhaust gas, as disclosed in Patent Document 1, for example.

The EGR device disclosed in Patent Document 1 opens and closes the EGR valve based on a detection signal from a clutch sensor configured to detect whether a clutch is on or off. Specifically, when a signal indicating that the clutch is off is acquired from the clutch sensor, in other words, when an acceleration operation is not performed, the EGR device determines that the engine is in the idling operation state, and performs control to close the EGR valve. However, for example, a power generator or a work machine is capable of operating while an accelerator is held at a certain position. Thus, when the accelerator is operated and held at a certain position under an operation condition that the exhaust gas contains unburned fuel, the exhaust gas is potentially continuously supplied to the EGR device.

PRIOR ART DOCUMENT

Patent Document

PTL1: JP S62-54264 U

SUMMARY OF THE INVENTION

Problem to be Solved by the Invention

The present invention provides an EGR device capable of determining whether an engine is in an idling state and controlling an EGR valve irrespective of the operated state of an accelerator.

Solutions to the Problems

According to an aspect of the present invention, in an EGR device configured to reflux part of exhaust gas of an engine as EGR gas into intake air of the engine, an EGR valve configured to restrict a flow rate of the EGR gas is closed when a rotation speed of the engine is between a low-speed threshold and a high-speed threshold and a fuel injection rate is between a low-injection rate threshold and a high-injection rate threshold that are set for each rotation speed.

According to another aspect of the present invention, a dead rotation speed width and a dead injection rate width are further set, and the EGR valve is closed when the rotation speed increases from a low-speed threshold Na by an amount larger than a dead rotation speed width Nh or the rotation speed decreases from the high-speed threshold by an amount larger than the dead rotation speed width, and the injection rate increases from the low-injection rate threshold by an amount larger than the dead injection rate width or the injection rate decreases from the high-injection rate threshold by an amount larger than the dead injection rate width.

According to another aspect of the present invention, the EGR valve is closed when the rotation speed is between the low-speed threshold Na and a high-speed threshold Nb for a predetermined time or longer, and the injection rate is between the low-injection rate threshold and the high-injection rate threshold for a predetermined time or longer.

According to another aspect of the present invention, a plurality of the low-speed thresholds, a plurality of the high-speed thresholds, a plurality of the low-injection rate thresholds, and a plurality of the high-injection rate thresholds are set and selectively switched depending on usage of the engine.

Effects of the Invention

The present invention achieves an effect as follows.

According to the present invention, an idling operational range is set based on a rotation speed of an engine and a fuel injection rate. This enables determination of whether the engine is in an idling state and control of an EGR valve irrespective of an operated state of an accelerator.

According to the present invention, the operation state of the engine is reliably recognized even when the rotation speed and the fuel injection rate vary near thresholds. This enables the determination of whether the engine is in an idling state and control of the EGR valve irrespective of the operated state of the accelerator.

According to the present invention, when the operation state is temporarily in the idling operational range, the engine is not determined to be in an idling state. This enables the determination of whether the engine is in an idling state and control of the EGR valve irrespective of the operated state of the accelerator.

According to the present invention, the idling operational range is set appropriately based on usage of the engine. This enables the determination of whether the engine is in an idling state and control of the EGR valve irrespective of the operated state of the accelerator.

EMBODIMENTS OF THE INVENTION

An engine 1 according to an embodiment of the present invention will be described below with reference to FIG. 1.

Figure 1:
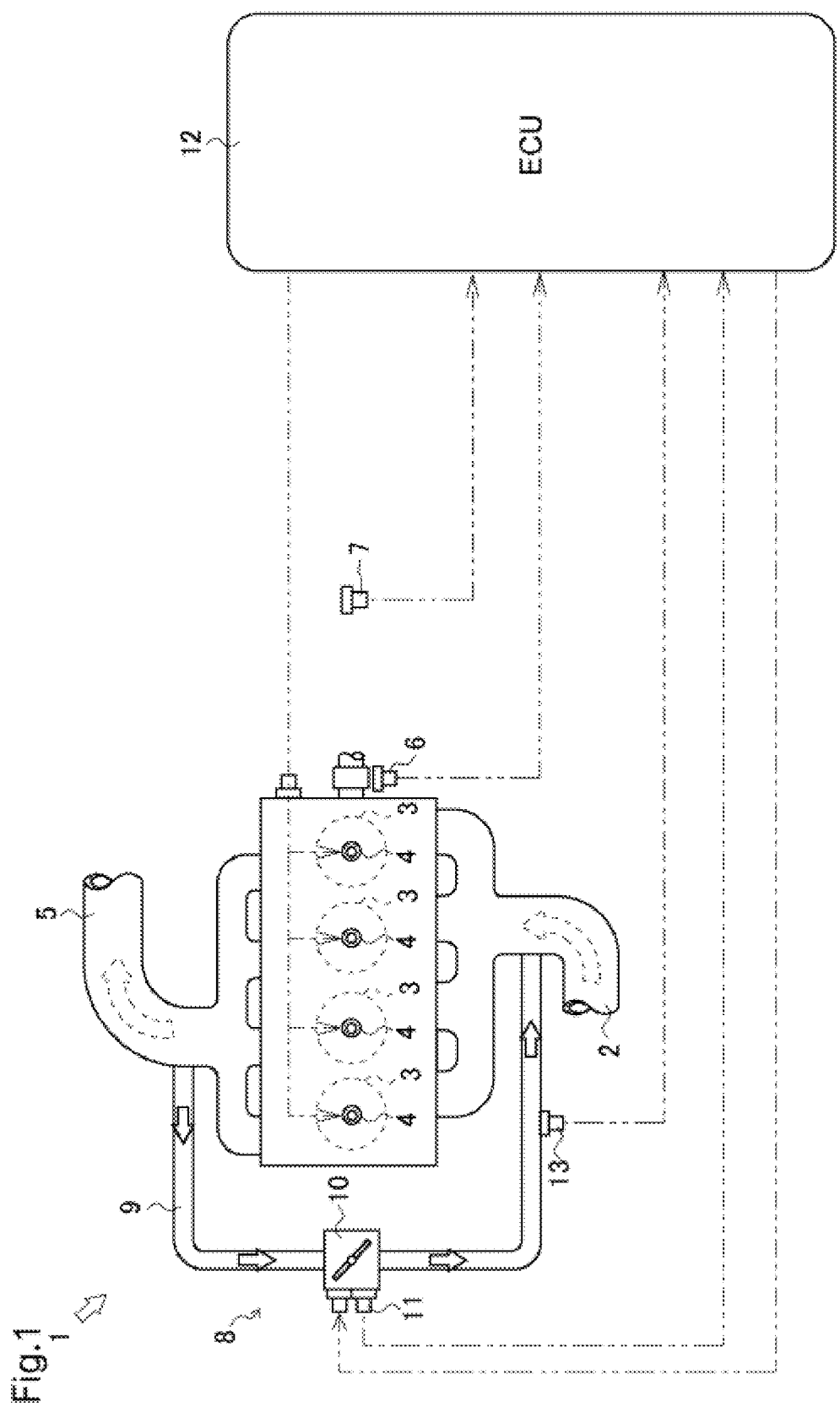
FIG. 1 schematically illustrates the configuration of an engine according to the present invention.

As illustrated in FIG. 1, the engine 1 is a diesel engine, and is an in-line four-cylinder engine 1 including four cylinders 3 in the present embodiment. Although the engine 1 is an in-line four-cylinder engine in the present embodiment, the present embodiment is not limited thereto. The engine 1 may include a supercharger.

The engine 1 rotates an output shaft by mixing, in each cylinder 3, intake air supplied into the cylinder 3 through an intake air pipe 2, and fuel supplied into the cylinder 3 from a fuel injection valve 4, and combusting the mixture. The engine 1 externally discharges, through an exhaust gas pipe 5, exhaust gas generated through fuel combustion.

The engine 1 includes an engine rotation speed detection sensor 6, an injection rate detection sensor 7 of the fuel injection valve 4, an EGR device 8, and an ECU 12 as a control device.

The engine rotation speed detection sensor 6 is configured to detect rotation speed N that is the rotation speed of the engine 1. The engine rotation speed detection sensor 6 includes a sensor and a pulsar, and is provided to the output shaft of the engine 1. Although the engine rotation speed detection sensor 6 includes the sensor and the pulsar in the present embodiment, any device capable of detecting rotation speed N is applicable.

The injection rate detection sensor 7 is configured to detect injection rate F that is the injection rate of fuel from the fuel injection valve 4. The injection rate detection sensor 7 is provided at a middle part of a fuel supply pipe not illustrated. The injection rate detection sensor 7 is a flow rate sensor. Although the injection rate detection sensor 7 is the flow rate sensor in the present embodiment, the present embodiment is not limited thereto, and any device capable of detecting fuel injection rate F is applicable.

The EGR device 8 is configured to reflux part of exhaust gas into intake air. The EGR device 8 includes an EGR pipe 9, an EGR valve 10, an opening degree detection sensor 11, and the ECU 12 as an EGR controller.

The EGR pipe 9 guides exhaust gas to the intake air pipe 2. The EGR pipe 9 is provided to communicate the intake air pipe 2 and the exhaust gas pipe 5. This configuration allows part of exhaust gas passing through the exhaust gas pipe 5 to be guided to the intake air pipe 2 through the EGR pipe 9. In other words, such a configuration is provided that part of exhaust gas as EGR gas is allowed to be refluxed into intake air (hereinafter, simply referred to as "EGR gas").

The EGR valve 10 is configured to restrict the flow rate of EGR gas passing through the EGR pipe 9. The EGR valve 10 is a normally-closed electromagnetic flow rate control valve. The EGR valve 10 is provided at a middle part of the valve. The EGR valve 10 can acquire a signal from the ECU 12 to be described later so as to change the opening degree of the EGR valve 10. Although the EGR valve 10 is a normally-closed electromagnetic flow rate control valve in the present embodiment, any device capable of restricting the flow rate of EGR gas is applicable.

The opening degree detection sensor 11 is configured to detect EGR valve opening degree G (not illustrated). The opening degree detection sensor 11 is a position detection sensor. The opening degree detection sensor 11 is provided to the EGR valve 10. Although the opening degree detection sensor 11 is a position detection sensor in the present embodiment, any device capable of detecting EGR valve opening degree G is applicable.

The ECU 12 is configured to control the engine 1. Specifically, the ECU 12 is configured to control the body of the engine 1 and the EGR device 8. The ECU 12 stores various kinds of computer programs and data such as rotation speed threshold map M1 (not illustrated), injection rate threshold map M2 (not illustrated), and dead band map M3 (not illustrated) for controlling the engine 1. The ECU 12 may have a configuration that a CPU, a ROM, a RAM, and a HDD, for example, are connected with each other through a bus, or may be achieved in one-chip LSI.

The ECU 12 is connected with the fuel injection valves 4, and is capable of controlling the fuel injection valves 4.

The ECU 12 is connected with the engine rotation speed detection sensor 6, and is capable of acquiring rotation speed N detected by the engine rotation speed detection sensor 6.

The ECU 12 is connected with the injection rate detection sensor 7, and is capable of acquiring injection rate F detected by the injection rate detection sensor 7.

The ECU 12 is connected with the EGR valve 10, and is capable of controlling the opening and closing of the EGR valve 10.

The ECU 12 is connected with the opening degree detection sensor 11, and is capable of acquiring EGR valve opening degree G detected by the opening degree detection sensor 11.

The ECU 12 is capable of calculating low-speed threshold Na and high-speed threshold Nb of rotation speed N of the engine 1 at which the engine 1 is determined to be in an idling state from the usage of the engine 1 based on rotation speed threshold map M1.

The ECU 12 is capable of calculating low-injection rate threshold Fa(n) and high-injection rate threshold Fb(n) of injection rate F of the engine 1 at which the engine 1 is determined to be in an idling state at each rotation speed N, based on the acquired usage of the engine 1, rotation speed N of the engine 1, and injection rate threshold map M2.

The ECU 12 is capable of calculating, based on dead band map M3 from the usage of the engine 1, dead rotation speed width Nh from low-speed threshold Na and high-speed threshold Nb at which the EGR valve 10 is closed, and dead injection rate width Fh from low-injection rate threshold Fa(n) and high-injection rate threshold Fb(n).

The ECU 12 is capable of externally setting the type of a work device driven by the engine 1 dedicated for the usage of the engine 1, specifically, for power generator, tractor, or backhoe, for example. This allows the ECU 12 to calculate various setting values suitable for the usage of the engine 1.

The ECU 12 may calculate various setting values in accordance with the environmental state of the engine based on values detected by an intake air temperature sensor and an atmospheric pressure sensor both not illustrated.

The following describes aspects of control of the EGR device 8 of the engine 1 according to an embodiment of the present invention with reference to FIGS. 2 to 5.

The ECU 12 calculates low-speed threshold Na and high-speed threshold Nb of rotation speed N based on an acquired usage of engine 1, low-injection rate threshold Fa(n) and high-injection rate threshold Fb(n) of injection rate F, dead rotation speed width Nh, and dead injection rate width Fh. Then, the ECU 12 determines whether the acquired rotation speed N and injection rate F are in ranges defined by their thresholds. If it is determined that rotation speed N and injection rate F are in the ranges defined by their thresholds, the ECU 12 determines that the engine 1 is in an idling operation state and closes the EGR valve 10.

Figure 2:
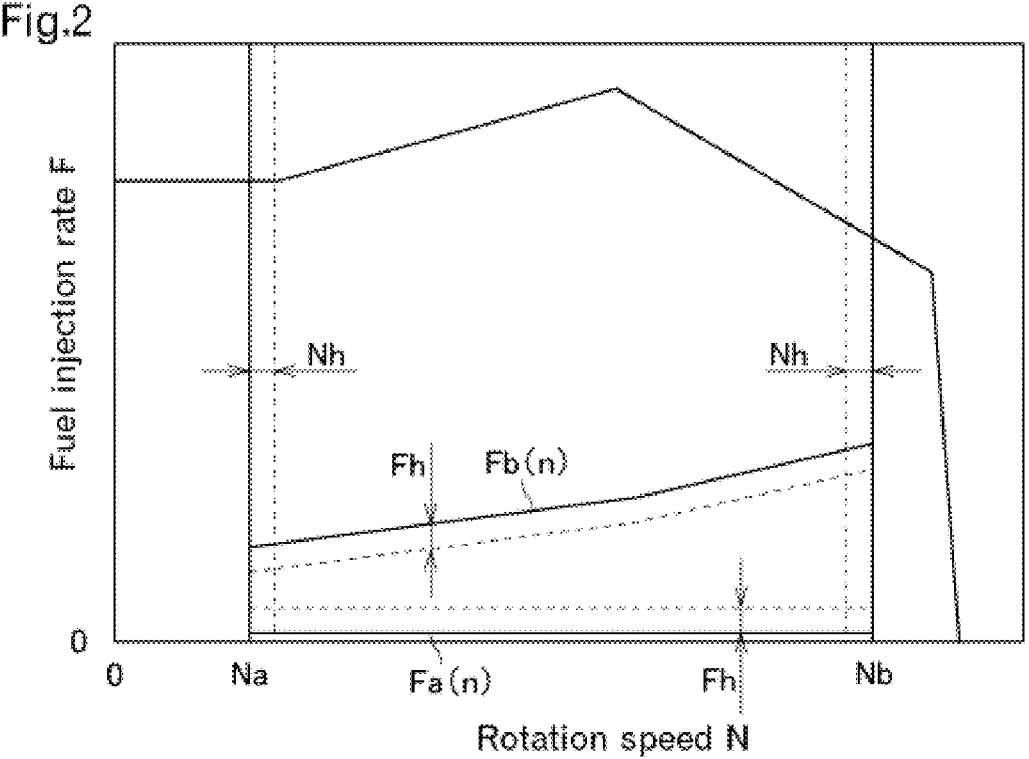
FIG. 2 illustrates a graph indicating a relation between a maximum fuel injection rate and an idling operational range at each rotation speed of the engine according to the present invention.

As illustrated in FIG. 2, low-speed threshold Na and high-speed threshold Nb of rotation speed N, and low-injection rate threshold Fa(n) and high-injection rate threshold Fb(n) of injection rate F are set in a range of rotation speed N of the engine 1 in which a maximum fuel injection rate is set. When rotation speed N is between low-speed threshold Na and high-speed threshold Nb and injection rate F is between low-injection rate threshold Fa(n) and high-injection rate threshold Fb(n) (hatched region in FIG. 2), the ECU 12 determines that the engine 1 is in an idling operation state.

When rotation speed N increases or decreases into a range defined by low-speed threshold Na and high-speed threshold Nb from out of the range, the ECU 12 does not close the EGR valve 10 unless rotation speed N increase or decrease from the threshold by dead rotation speed width Nh or more. Similarly, when injection rate F increases or decreases into a range defined by low-injection rate threshold Fa(n) and high-injection rate threshold Fb(n) from out of the range, the ECU 12 does not close the EGR valve 10 unless injection rate F increases or decreases from the threshold by dead injection rate width Fh or more.

Next, the control aspect of the EGR device 8 according to the present invention is described in detail.

Figure 3:
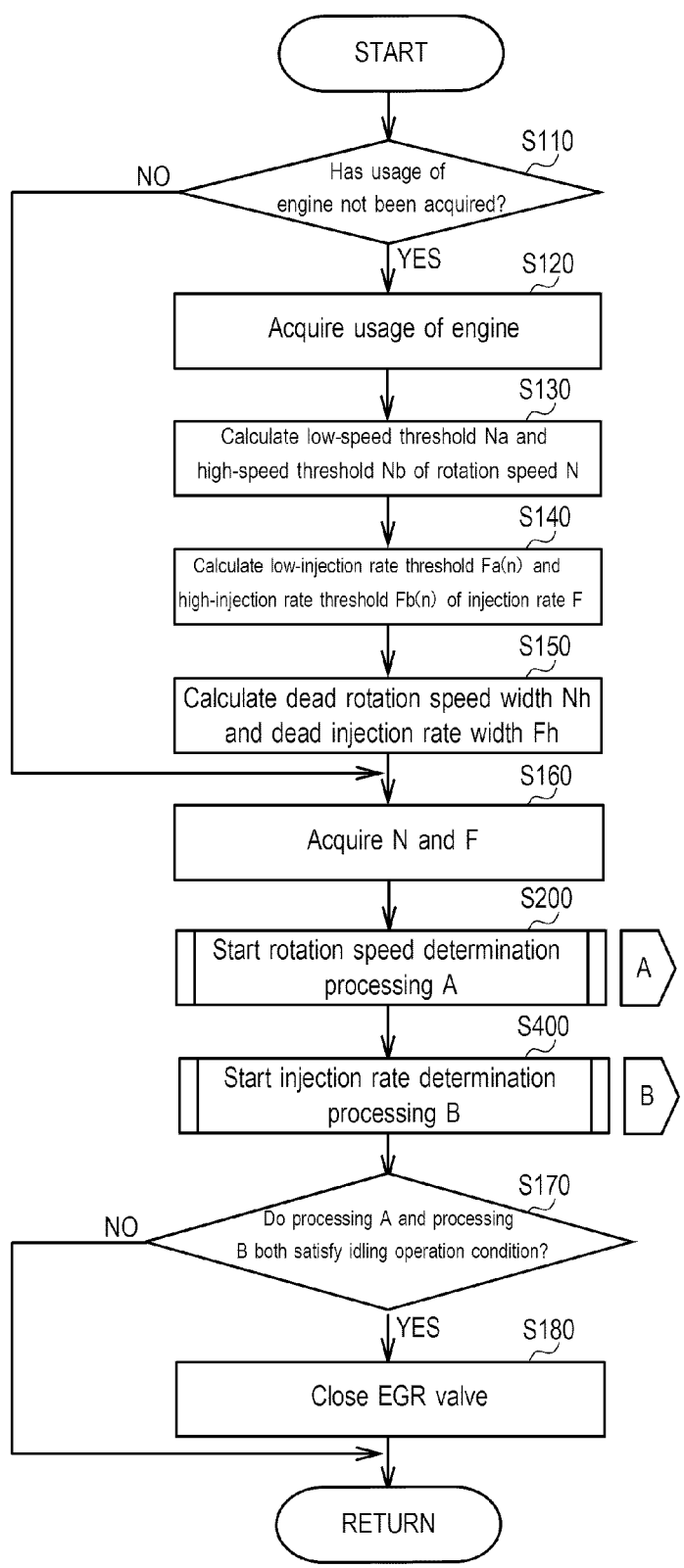
FIG. 3 illustrates a flowchart indicating an aspect of control to open and close an EGR valve of an EGR device 8 in an embodiment of an engine according to the present invention.

As illustrated in FIG. 3, in step S110, the ECU 12 determines whether setting of the usage of the engine 1 that is externally set has been acquired.

As a result, if it is determined that the setting of the usage of the engine 1 has not been acquired, the ECU 12 proceeds the process to step S120.

If it is determined that the setting of the usage of the engine 1 has been acquired, the ECU 12 proceeds the process to step S160.

In step S120, the ECU 12 acquires the setting of the usage of the engine 1, and proceeds the process to step S130.

In step S130, the ECU 12 calculates low-speed threshold Na and high-speed threshold Nb of rotation speed N from rotation speed threshold map M1 based on the acquired usage of engine 1, and proceeds the process to step S140.

In step S140, the ECU 12 calculates low-injection rate threshold Fa(n) and high-injection rate threshold Fb(n) of injection rate F from injection rate threshold map M2 based on the acquired usage of engine 1, and proceeds the process to step S150.

In step S150, the ECU 12 calculates dead rotation speed width Nh of rotation speed N and dead injection rate width Fh of injection rate F from dead band map M3 based on the acquired usage of engine 1, and proceeds the process to step S160.

In step S160, the ECU 12 acquires rotation speed N detected by the engine rotation speed detection sensor 6, detects injection rate F detected by the injection rate detection sensor 7, and proceeds the process to step S200.

Figure 4:
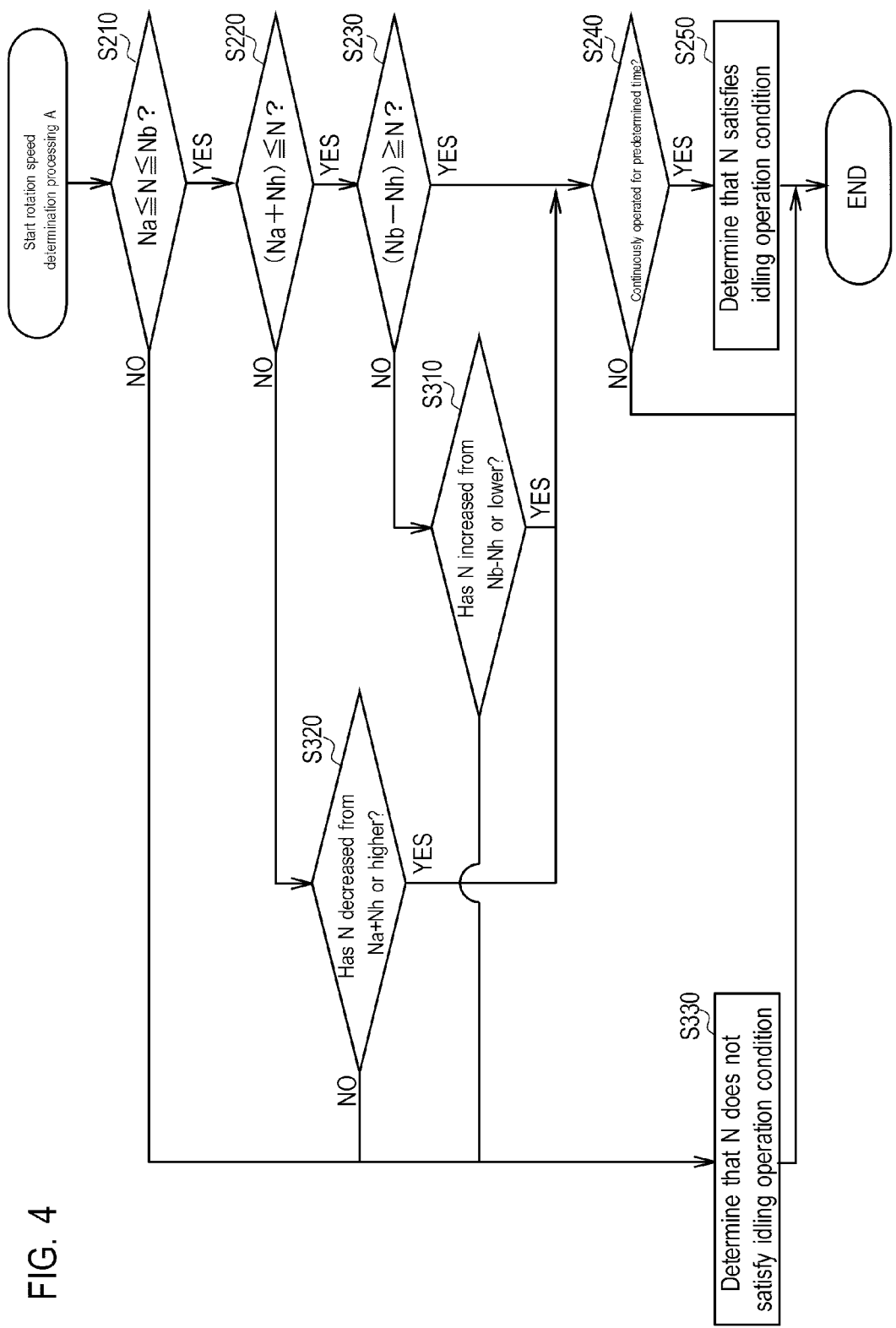
FIG. 4 illustrates a flowchart indicating an aspect of control of rotation speed determination processing on the EGR valve of the EGR device 8 in the embodiment of an engine according to the present invention.

In step S200, the ECU 12 starts rotation speed determination processing A, and proceeds the process to step S210 (refer to FIG. 4). Then, when rotation speed determination processing A ends, the ECU 12 proceeds the process to step S400.

Figure 5:
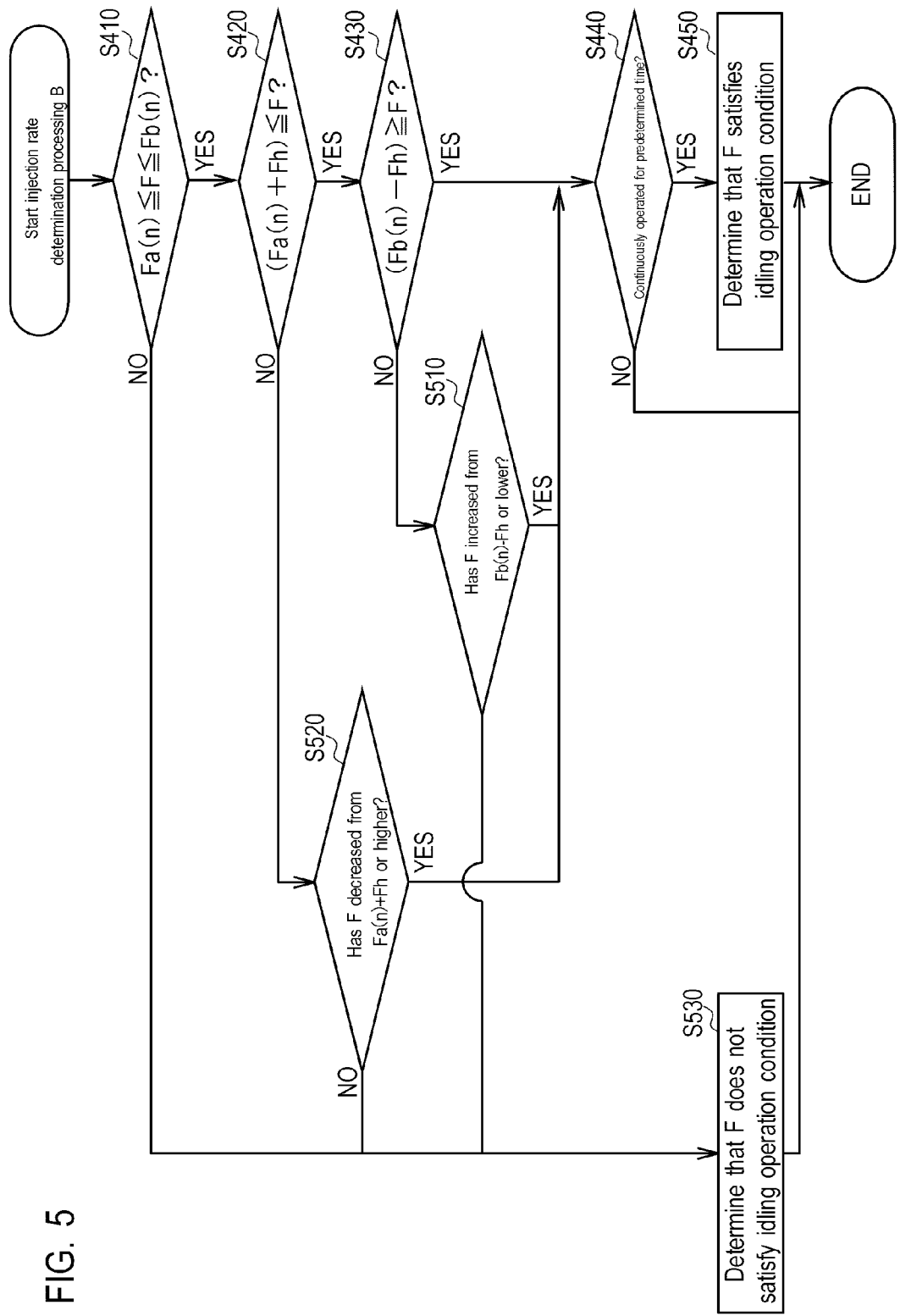
FIG. 5 illustrates a flowchart indicating an aspect of control of injection rate determination processing on the EGR valve of the EGR device 8 in the embodiment of the engine according to the present invention.

In step S400, the ECU 12 starts injection rate determination processing B, and proceeds the process to step S410 (refer to FIG. 5). Then, when injection rate determination processing B ends, the ECU 12 proceeds the process to step S170.

In step S170, the ECU 12 determines, based on determination results of rotation speed determination processing A and injection rate determination processing B, whether rotation speed N and injection rate F both satisfy conditions for determining that the engine is in an idling operation state.

As a result, if it is determined that rotation speed N and injection rate F both satisfy conditions for determining that the engine is in an idling operation state, the ECU 12 proceeds the process to step S180.

If it is determined that at least one of rotation speed N and injection rate F does not satisfy the condition for determining that the engine is in an idling operation state, the ECU 12 proceeds the process to step S110.

In step S180, the ECU 12 performs a control to close the EGR valve, and proceeds the process to step S110.

In step S200, the ECU 12 starts rotation speed determination processing A, and proceeds the process to step S210 (refer to FIG. 4).

As illustrated in FIG. 4, in step S210, the ECU 12 determines whether the acquired rotation speed N is not lower than low-speed threshold Na and not higher than high-speed threshold Nb.

As a result, if it is determined that rotation speed N is not lower than low-speed threshold Na and not higher than high-speed threshold Nb, the ECU 12 proceeds the process to step S220.

If it is determined that rotation speed N is lower than low-speed threshold Na or higher than high-speed threshold Nb, the ECU 12 proceeds the process to step S330.

In step S220, the ECU 12 determines whether the acquired rotation speed N is not lower than a rotation speed obtained by adding dead rotation speed width Nh to low-speed threshold Na.

As a result, if it is determined that rotation speed N is not lower than the rotation speed obtained by adding dead rotation speed width Nh to low-speed threshold Na, the ECU 12 proceeds the process to step S230.

If it is determined that rotation speed N is lower than the rotation speed obtained by adding dead rotation speed width Nh to low-speed threshold Na, the ECU 12 proceeds the process to step S320.

In step S230, the ECU 12 determines whether the acquired rotation speed N is not higher than a rotation speed obtained by subtracting dead rotation speed width Nh from high-speed threshold Nb.

As a result, if it is determined that rotation speed N is not higher than the rotation speed obtained by subtracting dead rotation speed width Nh from high-speed threshold Nb, the ECU 12 proceeds the process to step S240.

If it is determined that rotation speed N is higher than the rotation speed obtained by subtracting dead rotation speed width Nh from high-speed threshold Nb, the ECU 12 proceeds the process to step S310.

In step S240, the ECU 12 determines whether the engine 1 is continuously operated for a predetermined time at rotation speed N not lower than the rotation speed obtained by adding dead rotation speed width Nh to low-speed threshold Na and not higher than the rotation speed obtained by subtracting dead rotation speed width Nh from high-speed threshold Nb.

As a result, if it is determined that the engine 1 is continuously operated for the predetermined time at rotation speed N not lower than the rotation speed obtained by adding dead rotation speed width Nh to low-speed threshold Na and not higher than the rotation speed obtained by subtracting dead rotation speed width Nh from high-speed threshold Nb, the ECU 12 proceeds the process to step S250.

If it is determined that the engine 1 is not continuously operated for the predetermined time at rotation speed N not lower than the rotation speed obtained by adding dead rotation speed width Nh to low-speed threshold Na and not higher than the rotation speed obtained by subtracting dead rotation speed width Nh from high-speed threshold Nb, the ECU 12 ends rotation speed determination processing A and proceeds the process to step S400 (refer to FIG. 3).

In step S250, the ECU 12 determines that rotation speed N satisfies the condition for determining that the engine is in an idling operation state, ends rotation speed determination processing A, and proceeds the process to step S200 (refer to FIG. 3).

In step S310, the ECU 12 determines whether the acquired rotation speed N has increased from a rotation speed not higher than the rotation speed obtained by subtracting dead rotation speed width Nh from high-speed threshold Nb.

As a result, if it is determined that rotation speed N has increased from a rotation speed not higher than the rotation speed obtained by subtracting dead rotation speed width Nh from high-speed threshold Nb, the ECU 12 proceeds the process to step S240.

If it is determined that rotation speed N has not increased from a rotation speed not higher than the rotation speed obtained by subtracting dead rotation speed width Nh from high-speed threshold Nb, the ECU 12 proceeds the process to step S330.

In step S320, the ECU 12 determines whether the acquired rotation speed N has decreased from a rotation speed not lower than the rotation speed obtained by adding dead rotation speed width Nh to low-speed threshold Na.

As a result, if it is determined that the acquired rotation speed N has decreased from a rotation speed not lower than the rotation speed obtained by adding dead rotation speed width Nh to low-speed threshold Na, the ECU 12 proceeds the process to step S240.

If it is determined that the acquired rotation speed N has not decreased from rotation speed not lower than the rotation speed obtained by adding dead rotation speed width Nh to low-speed threshold Na, the ECU 12 proceeds the process to step S330.

In step S330, the ECU 12 determines that rotation speed N does not satisfy the condition for determining that the engine is in an idling operation state, ends rotation speed determination processing A, and proceeds the process to step S400 (refer to FIG. 3).

As illustrated in FIG. 3, in step S400, the ECU 12 starts injection rate determination processing B, and proceeds the process to step S410 (refer to FIG. 5).

As illustrated in FIG. 5, in step S410, the ECU 12 determines whether the acquired injection rate F is not lower than low-injection rate threshold Fa(n) and not higher than high-injection rate threshold Fb(n).

As a result, if it is determined that this injection rate F is not lower than low-injection rate threshold Fa(n) and not higher than high-injection rate threshold Fb(n), the ECU 12 proceeds the process to step S420.

If it is determined that this injection rate F is lower than low-injection rate threshold Fa(n) or higher than high-injection rate threshold Fb(n), the ECU 12 proceeds the process to step S530.

In step S420, the ECU 12 determines whether the acquired injection rate F is not lower than an injection rate obtained by adding dead injection rate width Fh to low-injection rate threshold Fa(n).

As a result, if it is determined that injection rate F is not lower than the injection rate obtained by adding dead injection rate width Fh to low-injection rate threshold Fa(n), the ECU 12 proceeds the process to step S430.

If it is determined that injection rate F is lower than the injection rate obtained by adding dead injection rate width Fh to low-injection rate threshold Fa(n), the ECU 12 proceeds the process to step S520.

In step S430, the ECU 12 determines whether the acquired injection rate F is not higher than an injection rate obtained by subtracting dead injection rate width Fh from high-injection rate threshold Fb(n).

As a result, if it is determined that injection rate F is not higher than the injection rate obtained by subtracting dead injection rate width Fh from high-injection rate threshold Fb(n), the ECU 12 proceeds the process to step S440.

If it is determined that injection rate F is higher than the injection rate obtained by subtracting dead injection rate width Fh from high-injection rate threshold Fb(n), the ECU 12 proceeds the process to step S510.

In step S440, the ECU 12 determines whether the engine 1 is continuously operated for a predetermined time at injection rate F not lower than the injection rate obtained by adding dead injection rate width Fh to low-injection rate threshold Fa(n) and not higher than the injection rate obtained by subtracting dead injection rate width Fh from high-injection rate threshold Fb(n).

As a result, if it is determined that the engine 1 is continuously operated for the predetermined time at injection rate F not lower than the injection rate obtained by adding dead injection rate width Fh to low-injection rate threshold Fa(n) and not higher than the injection rate obtained by subtracting dead injection rate width Fh from high-injection rate threshold Fb(n), the ECU 12 proceeds the process to step S250.

If it is determined that the engine 1 is not continuously operated for the predetermined time at injection rate F not lower than the injection rate obtained by adding dead injection rate width Fh to low-injection rate threshold Fa(n) and not higher than the injection rate obtained by subtracting dead injection rate width Fh from high-injection rate threshold Fb(n), the ECU 12 ends injection rate determination processing B and proceeds the process to step S170 (refer to FIG. 3).

In step S450, the ECU 12 determines that injection rate F satisfies the condition for determining that the engine is in an idling operation state, ends injection rate determination processing B, and proceeds the process to step S170 (refer to FIG. 3).

In step S510, the ECU 12 determines whether the acquired injection rate F has increased from an injection rate not higher than the injection rate obtained by subtracting dead injection rate width Fh from high-injection rate threshold Fb(n).

As a result, if it is determined that injection rate F has increased from an injection rate not higher than the injection rate obtained by subtracting dead injection rate width Fh from high-injection rate threshold Fb(n), the ECU 12 proceeds the process to step S440.

If it is determined that injection rate F has not increased from an injection rate not higher than the injection rate obtained by subtracting dead injection rate width Fh from high-injection rate threshold Fb(n), the ECU 12 proceeds the process to step S530.

In step S520, the ECU 12 determines whether the acquired injection rate F has decreased from an injection rate not lower than the injection rate obtained by adding dead injection rate width Fh to low-injection rate threshold Fa(n).

As a result, if it is determined that the acquired injection rate F has decreased from an injection rate not lower than the injection rate obtained by adding dead injection rate width Fh to low-injection rate threshold Fa(n), the ECU 12 proceeds the process to step S440.

If it is determined that the acquired injection rate F has not decreased from an injection rate not lower than the injection rate obtained by adding dead injection rate width Fh to low-injection rate threshold Fa(n), the ECU 12 proceeds the process to step S530.

In step S530, the ECU 12 determines that injection rate F does not satisfy the condition for determining that the engine is in an idling operation state, ends injection rate determination processing B, and proceeds the process to step S170 (refer to FIG. 3).

With this configuration, an idling operational range is set based on rotation speed N of the engine 1 and fuel injection rate F. Then, the operation state of the engine 1 is reliably recognized even when rotation speed N and fuel injection rate F vary near the thresholds. In addition, even when the operation state is temporarily in the idling operational range, the engine 1 is not determined to be in an idling state. The idling operational range is set appropriately based on the usage of the engine 1. This enables determination of whether the engine 1 is in an idling state and control of the EGR valve 10 irrespective of the operated state of an accelerator not illustrated.

The following describes a control to open the EGR valve 10 with reference to FIGS. 6A, 6B, 6C and 6D.

Figure 6D:
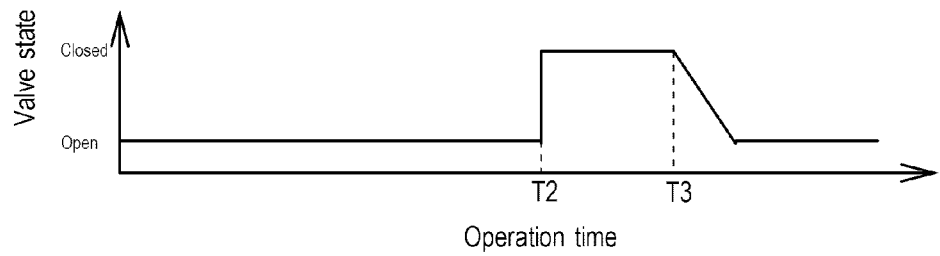
FIG. 6D illustrates a graph indicating a third embodiment of control of the EGR valve of the engine according to the present invention.
Figure 6C:
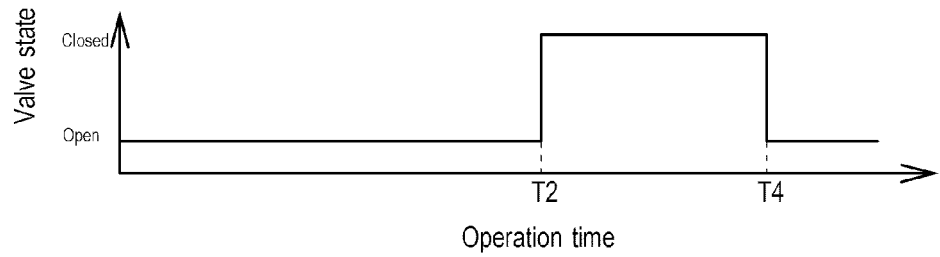
FIG. 6C illustrates a graph indicating a second embodiment of control of the EGR valve of the engine according to the present invention.
Figure 6B:
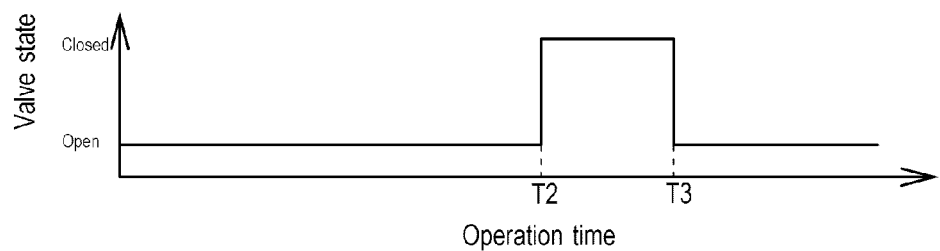
FIG. 6B illustrates a graph indicating a first embodiment of control of the EGR valve of the engine according to the present invention.
Figure 6A:
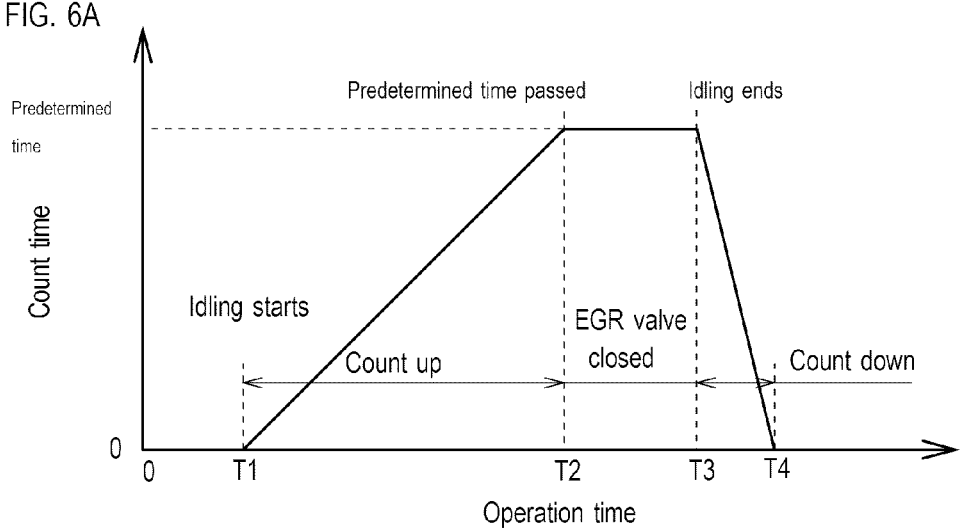
FIG. 6A illustrates a graph indicating control timing of the EGR valve of the engine according to the present invention.

As illustrated in FIG. 6A, if the operation state of the engine 1 satisfies an idling operation condition at operation time T1, the ECU 12 starts counting up a count-up time that can be optionally set so as to control the EGR valve 10. If the count time has reached at a predetermined time at operation time T2, the ECU 12 closes the EGR valve 10. If the operation state of the engine 1 no longer satisfies the idling operation condition at operation time T3, the ECU 12 starts counting down a count-down time that can be optionally set.

According to a first embodiment of the EGR valve control, which is illustrated in FIG. 6B, the ECU 12 closes the EGR valve 10 at a maximum closing speed at operation time T2. Then, the ECU 12 opens the EGR valve 10 at a maximum opening speed at operation time T3. In other words, if the operation state of the engine 1 no longer satisfies the idling operation condition, the ECU 12 immediately opens the EGR valve 10.

According to a second embodiment of the EGR valve control, which is illustrated in FIG. 6C, the ECU 12 closes the EGR valve 10 at the maximum closing speed at operation time T2. Then, the ECU 12 opens the EGR valve 10 at the maximum opening speed at operation time T4. In other words, if the operation state of the engine 1 no longer satisfies the idling operation condition, the ECU 12 opens the EGR valve 10 immediately after a count-down time that can be optionally set has passed.

According to a third embodiment of the EGR valve control, which is illustrated in FIG. 6D, the ECU 12 closes the EGR valve 10 at the maximum closing speed at operation time T2. Then, the ECU 12 starts opening the EGR valve 10 at an opening speed that is optionally set at operation time T3. In other words, if the operation state of the engine 1 no longer satisfies the idling operation condition, the ECU 12 opens the EGR valve 10 in an optional time.

INDUSTRIAL APPLICABILITY

The present invention is applicable to an EGR device.

DESCRIPTION OF REFERENCE SIGNS

1: Engine
8: EGR device
10: EGR valve
N: Rotation speed
Na: Low-speed threshold
Nb: High-speed threshold
Fa(n): Low-injection rate threshold
Fb(n): High-injection rate threshold
F: Injection rate

What is claimed is:

1. An exhaust gas recirculation (EGR) device configured to reflux part of exhaust gas of an engine as EGR gas into intake air of the engine, comprising:
an EGR valve configured to restrict a flow rate of the EGR gas,
an engine rotation speed detection sensor configured to detect rotation speed of the engine, and
an injection rate detection sensor configured to detect a fuel injection rate of fuel from fuel injection valves of the engine,
wherein the EGR valve is further configured to:
receive a close operation signal based on:
both detection of the rotation speed of the engine being within a rotation speed range defined by and between a low-speed threshold and a high-speed threshold and detection of the fuel injection rate being within an injection rate range defined by and between a low-injection rate threshold and a high-injection rate threshold, each of the low-injection rate threshold and the high-injection rate threshold corresponding to the rotation speed, and
the rotation speed being within the rotation speed range for a first time period that is greater than a predetermined time period, and the fuel injection rate being within the injection rate range for the first time period; and
receive a close operation signal based on:
the rotation speed increasing from the low-speed threshold by an amount larger than a dead rotation speed width or the rotation speed decreasing from the high-speed threshold by an amount larger than the dead rotation speed width, and
the fuel injection rate increasing from the low-injection rate threshold by an amount larger than a dead injection rate width or the fuel injection rate decreasing from the high-injection rate threshold by an amount larger than the dead injection rate width; and perform a close operation responsive to the close operation signal.

2. The EGR device according to claim 1, wherein the EGR valve is configured to be closed when the rotation speed is within the rotation speed range for a predetermined time or longer, and the fuel injection rate is within the injection rate range for the predetermined time or longer.

3. The EGR device according to claim 1, further comprising:
a memory device configured to store a plurality of low-speed thresholds comprising the low-speed threshold, a plurality of high-speed thresholds comprising the high-speed threshold, a plurality of low-injection rate thresholds comprising the low-injection rate threshold, and a plurality of high-injection rate thresholds comprising the high-injection rate threshold; and
a processor coupled to the memory device and configured to select the low-speed threshold, the high-speed threshold, the low-injection rate threshold, and the high-injection rate threshold based on usage of the engine.

4. The EGR device according to claim 3, wherein the processor is further configured to:
receive, from the engine rotation speed detection sensor, an indication of the rotation speed of the engine;
compare the rotation speed to the low-speed threshold, the high-speed threshold, or both;
generate the close operation signal based at least in part on a determination that the rotation speed is within the rotation speed range; and
send the close operation signal to the EGR valve.

5. The EGR device according to claim 4, wherein the processor is further configured to:
receive, from the injection rate detection sensor, an indication of the fuel injection rate;
compare the fuel injection rate to the low-injection rate threshold, the high-injection rate threshold, or both; and
generate the close operation signal based at least in part on a determination that the fuel injection rate is within the injection rate range.

6. The EGR device according to claim 2, further comprising:
a memory device configured to store a plurality of low-speed thresholds comprising the low-speed threshold, a plurality of high-speed thresholds comprising the high-speed threshold, a plurality of ] low-injection rate thresholds comprising the low-injection rate threshold, and a plurality of high-injection rate thresholds comprising the high-injection rate threshold; and
a processor coupled to the memory device and configured to select the low-speed threshold, the high-speed threshold, the low-injection rate threshold, and the high-injection rate threshold based on usage of the engine.

7. An exhaust gas recirculation (EGR) system comprising:
an EGR valve configurable in each of an open state and a closed state; and
an engine control unit (ECU) coupled to the EGR valve, the ECU configured to:
generate a close operation signal in response to:
a determination that a first rotation speed of an engine is within a rotation speed range defined by and between a low-speed threshold and a high-speed threshold; and
a determination that a first fuel injection rate is within an injection rate range defined by and between a first low-injection rate threshold and a first high-injection rate threshold, each of the first low-injection rate threshold and the first high-injection rate threshold corresponding to the first rotation speed; and
while the EGR valve is configured in the closed state and a second rotation speed of the engine is within the rotation speed range, generate an open operation signal in response to:
a determination of a second fuel injection rate being outside the injection rate range defined by a second low-injection rate threshold and a second high-injection rate threshold, each of the second low-injection rate threshold and the second high-injection rate threshold corresponding to the second rotation speed; and
wherein the EGR valve configured to perform a close operation responsive to the close operation signal and to perform an open operation responsive to the open operation signal.

8. The EGR system claim 7, wherein the ECU is further configured to:
receive, from an engine rotation speed detection sensor, speed rotation data associated with the first rotation speed of the engine;
determine the first rotation speed of the engine based on the speed rotation data;
receive, from an injection rate detection sensor, fuel injection rate data associated with a fuel injection rate of fuel from fuel injection valves of the engine;
determine the first fuel injection rate based on the fuel injection rate data; and
select the first low-injection rate threshold and the first high-injection rate threshold based on the first rotation speed.

9. The EGR system claim 8, wherein the ECU is further configured to:
receive each of the low-speed threshold, the high-speed threshold, the first low-injection rate threshold, and the first high-injection rate threshold;
store each of the low-speed threshold, the high-speed threshold, the first low-injection rate threshold, and the first high-injection rate threshold; and
access each of the low-speed threshold, the high-speed threshold, the first low-injection rate threshold, and the first high-injection rate threshold.

10. The EGR system claim 8, wherein the ECU is further configured to:
determine each of the low-speed threshold, the high-speed threshold, the first low-injection rate threshold, and the first high-injection rate threshold;
store each of the low-speed threshold, the high-speed threshold, the first low-injection rate threshold, and the first high-injection rate threshold; and
access each of the low-speed threshold, the high-speed threshold, the first low-injection rate threshold, and the first high-injection rate threshold.

11. The EGR system claim 8, further comprising:
the engine comprising the fuel injection valves;
the engine rotation speed detection sensor;
the injection rate detection sensor;
an air intake pipe coupled to the engine; and
an exhaust gas pipe coupled to the engine;

wherein the EGR valve is configured restrict a portion of exhaust gas from the exhaust gas pipe to the air intake pipe, via an EGR pipe, based on an opening degree of the EGR valve.

12. The EGR system of claim 11, wherein:
the ECU is further configured to generate a close operation signal for any rotation speed within the rotation speed range while the first fuel injection rate is within the injection rate range;
the injection rate detection sensor comprises a flow rate sensor provided at a middle part of a fuel supply pipe; and
the EGR valve comprises a normally-closed electromagnetic flow rate control valve provided at a middle part of the EGR pipe.

13. The EGR system claim 7, wherein:
the ECU is further configured to generate a close operation signal in response to a determination that the first rotation speed is within the rotation speed range for a first predetermined time and determination that the fuel injection rate is between the first low-injection rate threshold and the first high-injection rate threshold for at least the first predetermined time; and
the ECU is further configured to generate an open operation signal in response to a determination that the second rotation speed is outside the rotation speed range for a second predetermined time; and
the first predetermined time is greater than the second predetermined time.

14. An exhaust gas recirculation (EGR) system comprising:
a processor; and
one or more memory devices coupled to the processor and configured to store instructions that, when executed by the processor, cause the processor to:
determine a rotation speed of an engine;
determine a fuel injection rate associated with the engine;
generate a close operation signal in response to a determination that a first rotation speed and a first fuel injection rate are both within a closed operation zone for engine rotation speed and engine fuel injection rate, the closed operation zone defined and enclosed by:
a low-speed threshold boundary with respect to the rotation speed,
a high-speed threshold boundary with respect to the rotation speed,
a low-injection rate threshold boundary with respect to the fuel injection rate, and
a high-injection rate threshold boundary with respect to the fuel injection rate;
generate an open operation signal in response to a determination that the rotation speed or the fuel injection rate is outside of the closed operation zone; and
send the close operation signal or the open operation signal to an EGR valve.

15. The EGR system of claim 14, wherein the processor is further configured to:
generate the close operation signal in response to the rotation speed and the fuel injection rate being within the closed operation zone for a predetermined period of time or longer; and
generate the open operation signal in response to the rotation speed and the fuel injection rate being within the closed operation zone for less than the predetermined period of time.

16. The EGR system of claim 14, wherein:
at least one memory device of the one or more memory devices is configured to store:
a rotation speed threshold map associated with the closed operation zone; and
an injection rate threshold map associated with the closed operation zone;
the first rotation speed is any rotation speed between the low-speed threshold boundary and the high-speed threshold boundary; and
the first fuel injection rate is any fuel injection rate between the low-injection rate threshold boundary and the high-injection rate threshold boundary.

17. The EGR system of claim 16, wherein the instructions, when executed by the processor, further cause the processor to:
compare the rotation speed to a sub-range of the rotation speed threshold map; and
compare the fuel injection rate to a sub-range of the injection rate threshold map.

18. The EGR system of claim 14, wherein the instructions, when executed by the processor, further cause the processor to:
in response to a determination that the rotation speed has transitioned into the closed operation zone and in response to a determination that the rotation speed is outside of a sub-range of the closed operation zone, determine whether a change in rotational speed associated with the rotation speed is decreasing or increasing; and
in response to a determination that the fuel injection rate has transitioned into the closed operation zone and in response to a determination that the fuel injection rate is outside of the sub-range of the closed operation zone, determine whether a change in rate associated with the fuel injection rate is increasing or decreasing.

* * * * *